(12) United States Patent
Yamazaki et al.

(10) Patent No.: US 7,234,712 B2
(45) Date of Patent: Jun. 26, 2007

(54) HIGH-MOUNTED DOUBLE WISHBONE SUSPENSION DEVICE

(75) Inventors: Tatsuya Yamazaki, Saitama (JP); Hirokazu Hirata, Saitama (JP); Yutaka Hozumi, Saitama (JP); Akihiro Maejima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 222 days.

(21) Appl. No.: 11/007,264

(22) Filed: Dec. 9, 2004

(65) Prior Publication Data

US 2005/0146111 A1 Jul. 7, 2005

(30) Foreign Application Priority Data

Dec. 16, 2003 (JP) ............... 2003-417548

(51) Int. Cl.
*B62D 7/16* (2006.01)
(52) U.S. Cl. ............... 280/93.51; 280/93.512
(58) Field of Classification Search ............ 280/93.51, 280/93.511, 93.512
See application file for complete search history.

(56) References Cited

U.S. PATENT DOCUMENTS

| | | | | | |
|---|---|---|---|---|---|
| 2,432,708 | A | * | 12/1947 | Ash ...................... | 280/93.512 |
| 6,099,003 | A | * | 8/2000 | Olszewski et al. ...... | 280/93.512 |
| 6,179,308 | B1 | * | 1/2001 | Mielauskas et al. ... | 280/93.512 |
| 6,431,569 | B2 | * | 8/2002 | Handa ................. | 280/124.138 |
| 6,568,497 | B1 | * | 5/2003 | Tezuka et al. .......... | 180/346 |

FOREIGN PATENT DOCUMENTS

| | | | |
|---|---|---|---|
| DE | 195 06 585 A1 | 8/1995 | |
| JP | 56-82668 | * 7/1981 | ............ 280/93.512 |
| JP | 02-241811 | 9/1990 | |
| JP | 2638605 | 4/1997 | |
| JP | 11-091325 | 4/1999 | |
| JP | 2003-14037 | 1/2003 | |

OTHER PUBLICATIONS

Kumano, Manabu, "Mechanism of suspension and Traveling Performance"; Aug. 20, 1997; pp. 138-139; Publisher, Grand Prix Shuppan of Tokyo, Japan.

* cited by examiner

*Primary Examiner*—Eric Culbreth
(74) *Attorney, Agent, or Firm*—Arent Fox LLP

(57) ABSTRACT

In a high-mounted double wishbone suspension device, an arm portion extending upward from a knuckle main body portion, through which an axle runs, is provided with a tie rod connection portion. A tie rod for turning a wheel is connected to the tie rod connection portion. The distance between the axle and the tie rod connection portion is increased to effectively suppress knuckle lateral vibration centered on the axle by the tie rod. Therefore, it is possible to reduce road noise without increasing the number of components or the weight. In particular, since the tie rod is connected to a joint provided on a lower face of the tie rod connection portion, it is possible to minimize vertical positional change of the tie rod, while suppressing lateral vibration of the knuckle by raising the position of the tie rod connection portion, whereby the arrangement can be easily applied to a conventional vehicle merely by replacing the knuckle alone.

2 Claims, 5 Drawing Sheets

HIGH-MOUNTED DOUBLE WISHBONE SUSPENSION DEVICE

RELATED APPLICATION DATA

The Japanese priority application No. 2003-417548 upon which the present application is based is hereby incorporated in its entirety herein by reference.

BACKGROUND OF THE INVENTION

1. Field of the Invention

The present invention relates to a high-mounted double wishbone suspension device comprising: a knuckle rotatably supporting a wheel, and comprising a knuckle main body portion and an arm portion extending upward from the knuckle main body portion; a lower arm vertically movably supporting on a vehicle body a lower part of the knuckle main body portion through which an axle runs; and an upper arm vertically movably supporting on the vehicle body the arm portion.

2. Description of the Related Art

In a so-called high-mounted double wishbone suspension device in which an arm portion extending upward from a knuckle is made to project above a tire and the upper end of the arm portion is connected to the extremity of an upper arm, since it is necessary to connect the base end of the upper arm to an inner face of a wheelhouse, vibration in the vicinity of a certain frequency (e.g., 300 Hz) input from the road surface to the tire is transmitted from the knuckle through the upper arm to the wheelhouse, leading to a problem that the vibration is easily transmitted as road noise to the interior of a vehicle compartment.

Japanese Patent Application Laid-open No. 2003-14037 discloses an arrangement in which, in order to suppress the vibration of the upper arm so as to reduce the road noise, a dynamic damper is mounted on the upper arm.

However, in the conventional arrangement, the dynamic damper is used for suppressing the vibration of the upper arm, leading to a problem that the number of components and the weight are increased corresponding to the dynamic damper.

SUMMARY OF THE INVENTION

The present invention has been accomplished under the above-mentioned circumstances, and it is an object thereof to reduce the road noise transmitted by a high-mounted double wishbone suspension device without increasing the number of components or the weight.

In order to attain this object, in accordance with a first aspect of the present invention, there is provided a high-mounted double wishbone suspension device including; a knuckle rotatably supporting a wheel; a lower arm vertically movably supporting on a vehicle body a lower part of a knuckle main body portion through which an axle runs; and an upper arm vertically movably supporting on the vehicle body an arm portion extending upward from the knuckle main body portion, wherein the arm portion is provided with a tie rod connection portion via which a tie rod for turning the wheel is connected to the knuckle.

Furthermore, in accordance with a second aspect of the present invention, in addition to the first aspect, a lower face of the tie rod connection portion of the knuckle is provided with a joint for joining the tie rod to the tie rod connection portion.

A ball joint of an embodiment corresponds to the joint of the present invention, and a wheelhouse and a frame of the embodiment correspond to the vehicle body of the present invention.

With the arrangement of the first aspect, in the high-mounted double wishbone suspension device in which the knuckle is supported vertically movably via the lower arm and the upper arm, the tie rod connection portion is provided in the arm portion to extend upward from the knuckle main body portion through which the axle runs, and the tie rod for turning the wheel is connected to the tie rod connection portion. Therefore, it is possible for the tie rod to effectively suppress knuckle lateral vibration centered on the axle by increasing the distance from the axle to the tie rod connection portion, thereby reducing the road noise without increasing the number of components or the weight.

With the arrangement of the second aspect, since the tie rod is joined to the joint provided on the lower face of the tie rod connection portion, it is possible to minimize vertical positional change of the tie rod while suppressing lateral vibration of the knuckle by raising the position of the tie rod connection portion, whereby the arrangement can be easily applied to a conventional vehicle merely by changing the knuckle alone.

The above-mentioned object, other objects, characteristics, and advantages of the present invention will become apparent from an explanation of a preferred embodiment that will be described in detail below by reference to the attached drawings.

DESCRIPTION OF THE PREFERRED EMBODIMENT

Figure 1:
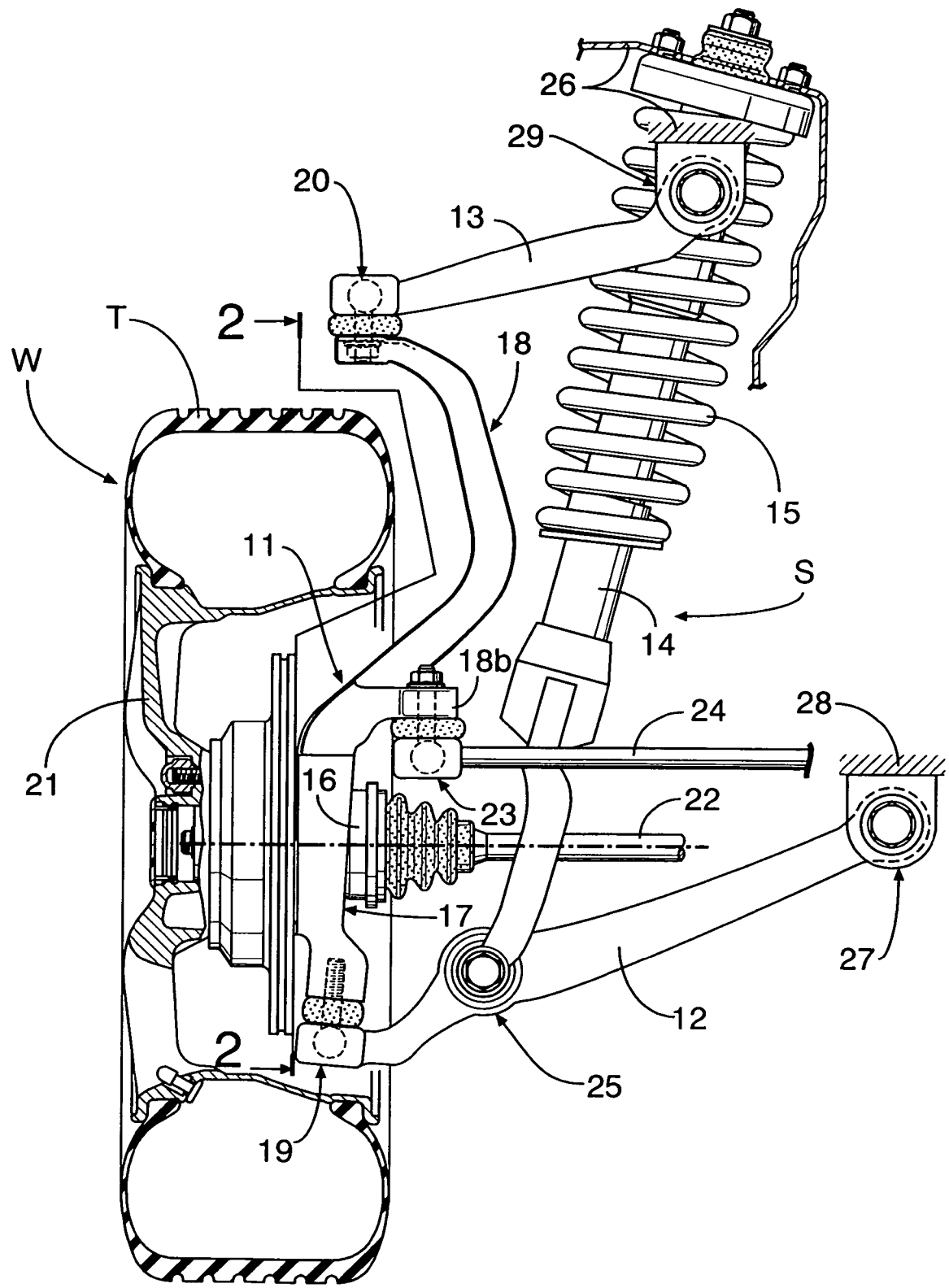
FIG. 1 is a rear view of a double wishbone suspension device according to an embodiment of the present invention.
Figure 2:
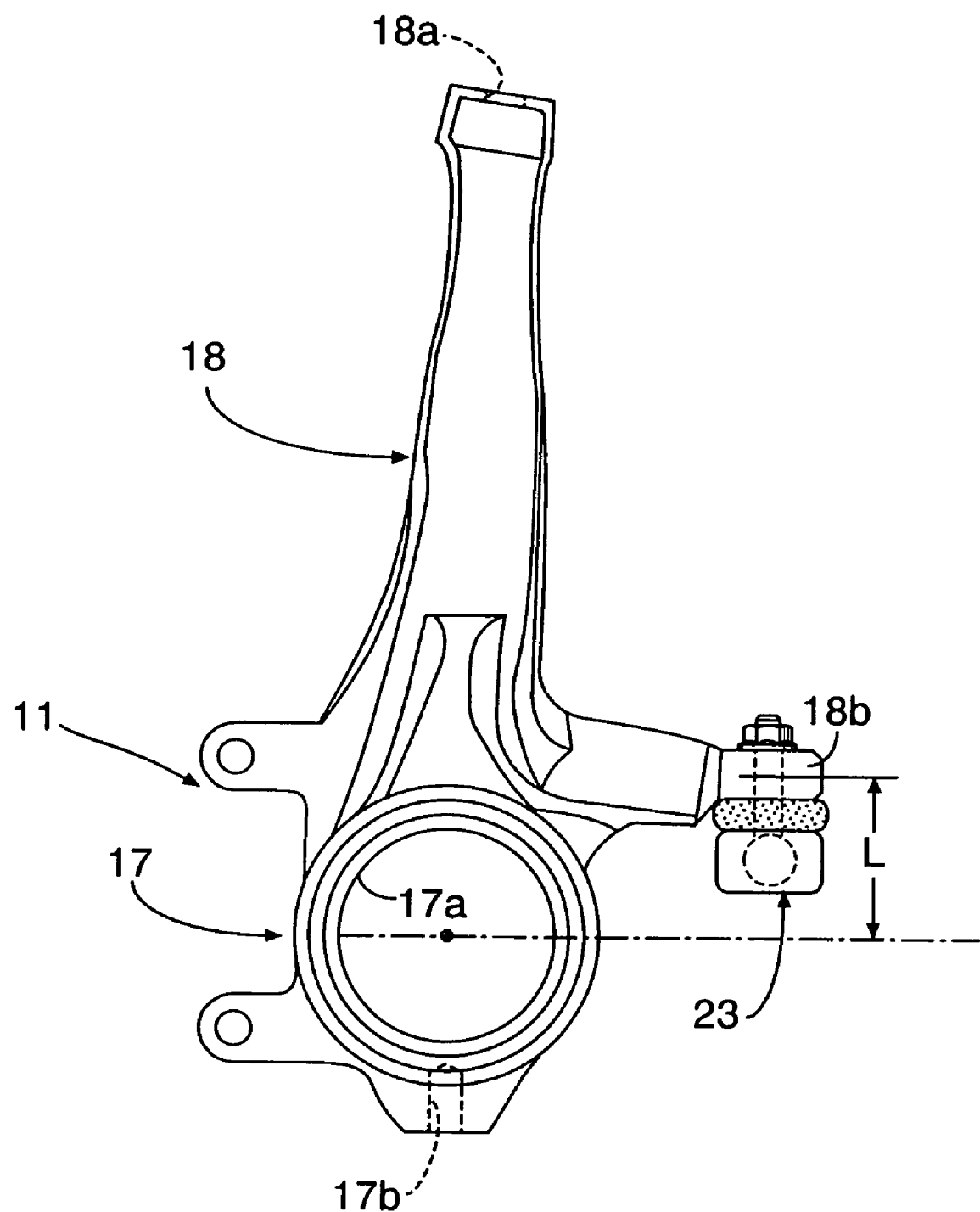
FIG. 2 is a view along arrowed line 2—2 in FIG. 1.

FIG. 1 and FIG. 2 show a high-mounted double wishbone suspension device for suspending a front wheel W which is a driven wheel. The high-mounted double wishbone suspension device includes: a knuckle 11; a lower arm 12; an upper arm 13; a hydraulic damper 14; and a suspension spring 15. The knuckle 11 is formed from: a knuckle main body portion 17 for rotatably supporting an axle 16 via a ball bearing (not illustrated); and an arm portion 18 extending upward from the knuckle main body portion 17 over a tire T of the front wheel W. Formed in the middle of the knuckle main body portion 17 is a ball bearing support hole 17a into which the ball bearing is fitted. Formed in the lower end of the knuckle main body portion 17 is a mounting hole 17b for receiving a ball joint 19 that pivotably supports the extremity of the lower arm 12. Formed in the upper end of the arm portion 18 is a mounting hole 18a for mounting a ball joint 20 that pivotably supports the extremity of the upper arm 13. Formed at the lower end of the arm portion 18 is a tie rod connection portion 18b that extends toward the rear of the vehicle body.

A wheel body 21 of the front wheel W is fixed to the extremity of the axle 16 which is rotatably supported by the knuckle 11. The base end of the axle is connected to an engine via a drive shaft 22. A tie rod 24 is connected to a lower face of the tie rod connection portion 18b of the knuckle 11 via a ball joint 23. Moving the tie rod 24 laterally by means of a steering wheel allows the knuckle 11 to swing laterally, with the ball joint 19 at the extremity of the lower arm 12 and the ball joint 20 at the extremity of the upper arm 13 as fulcrums, thus turning the front wheel W.

The hydraulic damper 14 whose lower end is supported via a rubber bush joint 25 at a position close to the extremity of the lower arm 12, has its upper end fixed to an inner face of the wheelhouse 26. The suspension spring 15 is arranged so as to surround the outer periphery of the hydraulic damper 14. The base end of the lower arm 12 is supported on a frame 28 via a rubber bush joint 27. The base end of the upper arm 13 is supported on an inner face of the wheelhouse 26 via a rubber bush joint 29.

Figure 4:
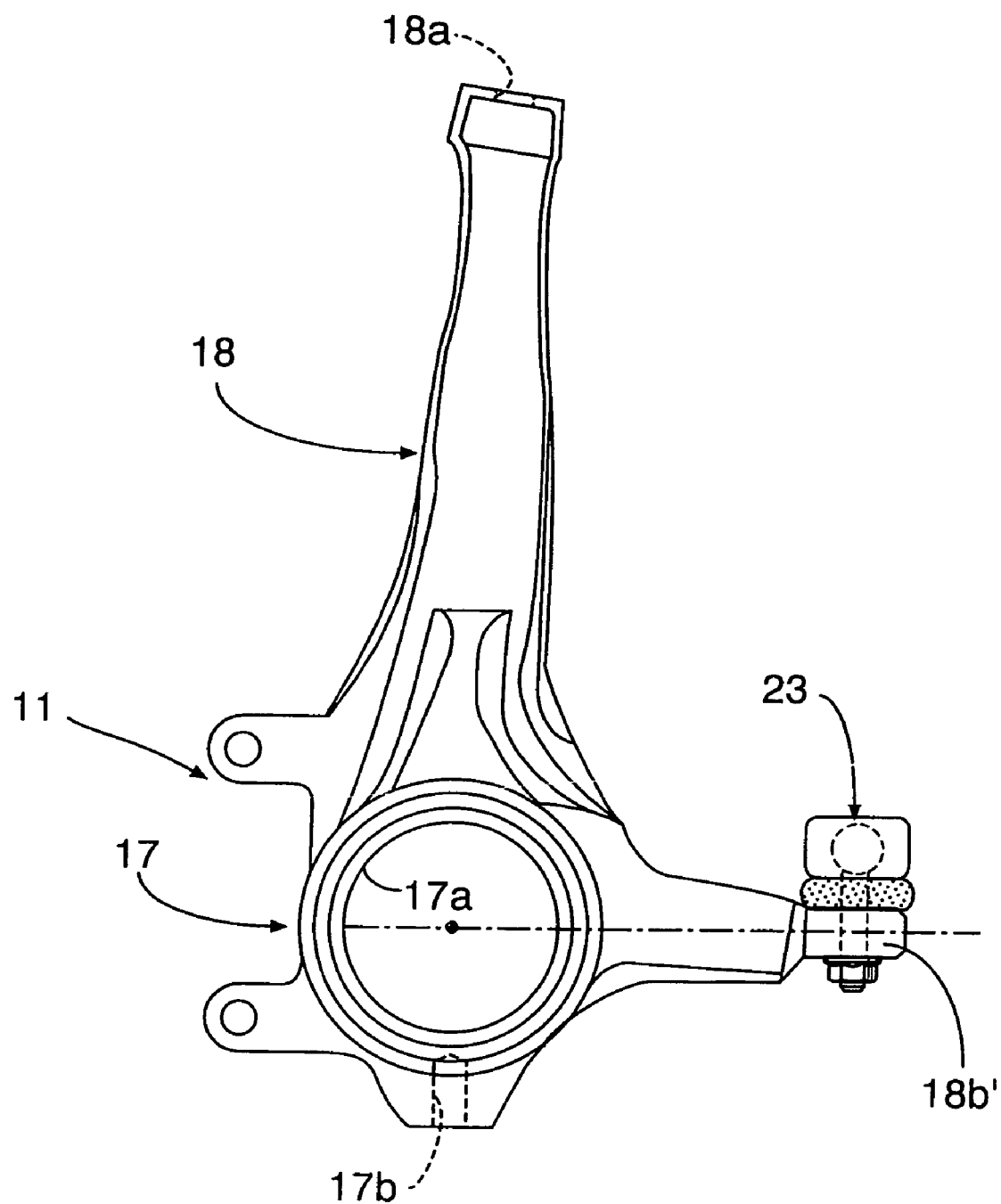
FIG. 4 is a view corresponding to FIG. 2, showing a comparative example.
Figure 5:
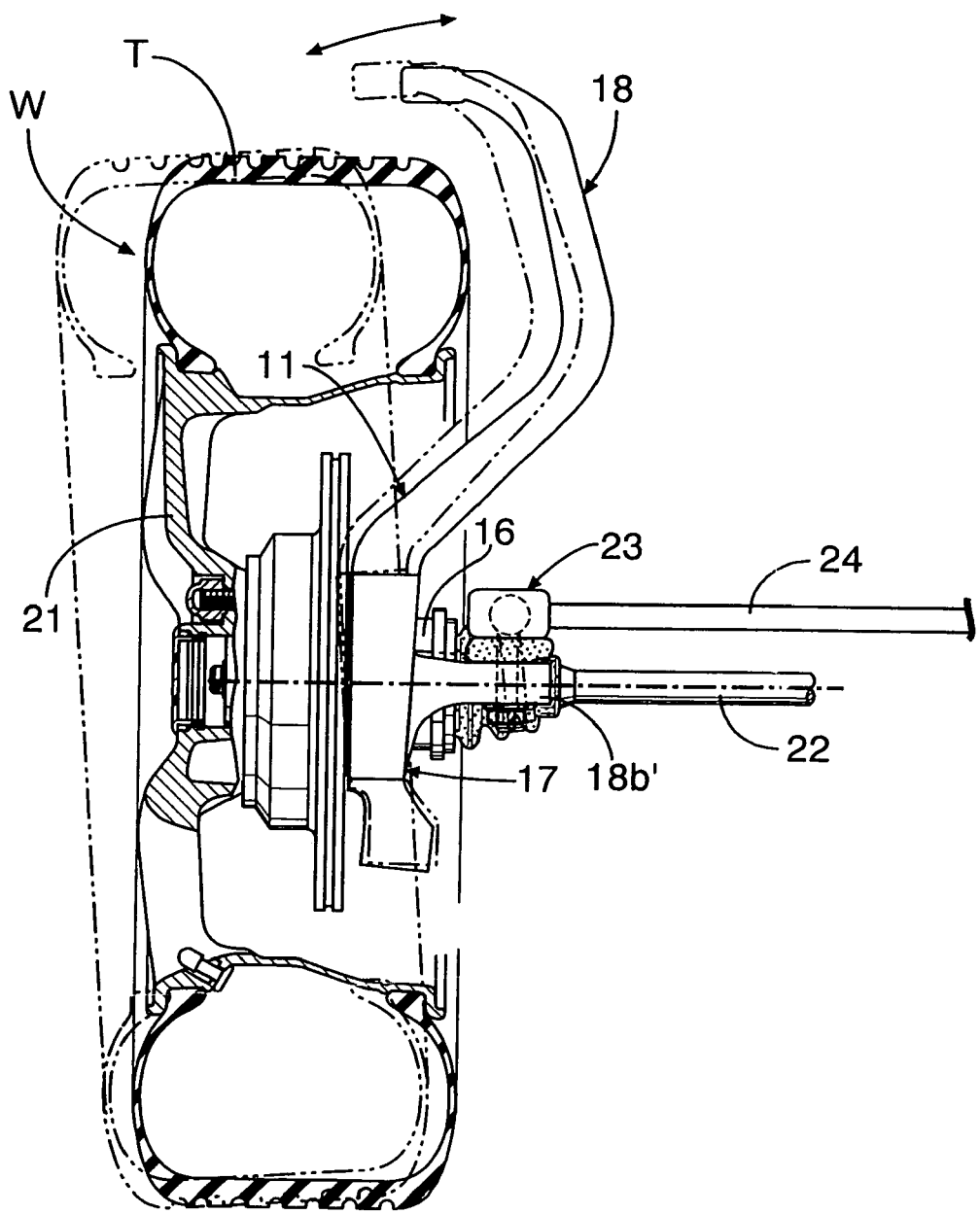
FIG. 5 is a diagram for explaining the operation of the comparative example.

FIG. 4 and FIG. 5 show a comparative example, in which a tie rod connection portion 18b' is provided not on an arm portion 18 of a knuckle 11 but on a knuckle main body portion 17. In the embodiment shown in FIG. 2 a vertical moment arm L is secured between the center of the axle 16 and the tie rod connection portion 18b, whereas in the comparative example shown in FIG. 4 the center of an axle 16 and the tie rod connection portion 18b' are at substantially the same height and there is no moment arm.

Figure 3:
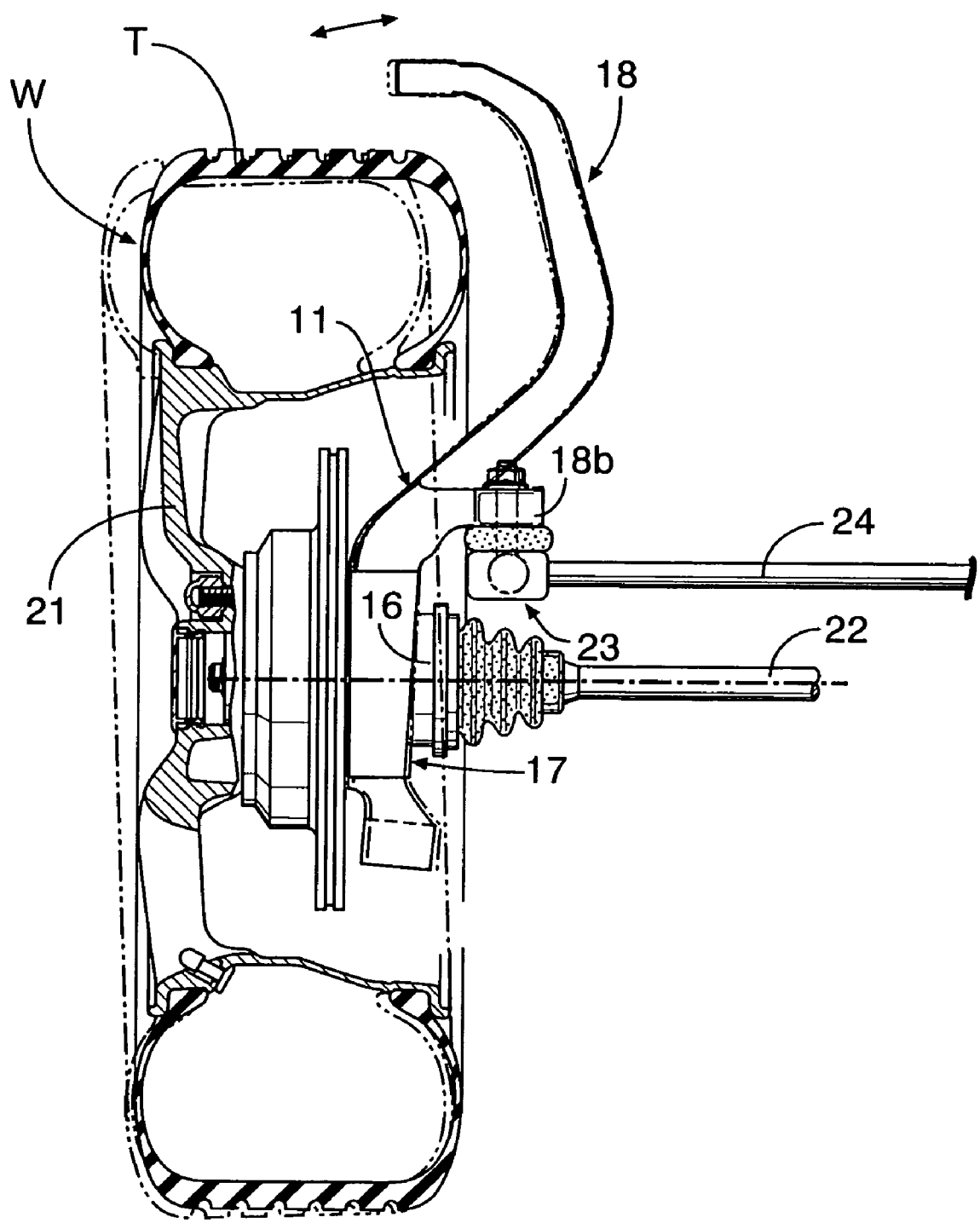
FIG. 3 is a diagram for explaining the operation of the embodiment.

Therefore, when vibration around a certain frequency (e.g., 300 Hz) is input from the road surface, the wheel W vibrates laterally. A tie rod 24 in the comparative example shown in FIG. 5 contributes little to suppression of the vibration, leading to a problem that the amplitude increases so that vibration and noise are transmitted from a wheelhouse 26 to a vehicle compartment. On the other hand, in the embodiment shown in FIG. 3, since the moment arm L between the center of the axle 16 and the tie rod connection portion 18b is large, the tie rod 24 effectively contributes to suppression of the vibration. As a result, the amplitude decreases and it becomes difficult for vibration and noise to be transmitted from the wheelhouse 26 to the vehicle compartment, thereby contributing to a reduction of road noise.

Furthermore, since the tie rod 24 is connected by providing the ball joint 23 on the lower face of the tie rod connection portion 18b, there is little change in the height of the tie rod 24 between the embodiment shown in FIG. 2 and the comparative example shown in FIG. 4. Therefore, it is possible to obtain the effect of reducing road noise merely by replacing the knuckle of the comparative example with the knuckle 11 of the embodiment. Moreover, since no special component is needed, the number of components and the cost do not increase.

Although an embodiment of the present invention has been described in detail, the present invention can be modified in a variety of ways without departing from the subject matter of the present invention.

For example, in the embodiment the knuckle 11 is formed from a single member, but it may be formed by integrally joining a plurality of members.

What is claimed is:

1. A high-mounted double wishbone suspension device comprising:
   a knuckle rotatably supporting a wheel, and comprising a knuckle main body portion and an arm portion extending upward from the knuckle main body portion;
   a lower arm vertically movably supporting on a vehicle body a lower part of the knuckle main body portion through which an axle runs; and
   an upper arm vertically movably supporting the arm portion on the vehicle body,
   wherein the arm portion is provided with a tie rod connection portion by which a tie rod used for turning the wheel is connected to the knuckle,
   wherein a joint for joining the tie rod to the tie rod connection portion is provided on a lower face of the tie rod connection portion of the knuckle, and
   wherein the knuckle is provided with a ball bearing support hole for the wheel and the tie rod connection portion is positioned below a middle point between a center of the ball bearing support hole and a ball joint provided at a connection point of the arm portion to the upper arm.

2. The high-mounted double wishbone suspension device according to claim 1, wherein the connection point is disposed above the axle of the wheel relative to the lower arm.

* * * * *